United States Patent [19]

Fahey

[11] 3,800,000
[45] Mar. 26, 1974

[54] PROCESS FOR RECOVERING A NICKEL(0) OLIGOMERIZATION CATALYST IN THE FORM OF A NICKEL(II) DIMERIZATION CATALYST

[75] Inventor: Darryl R. Fahey, Bartlesville, Okla.

[73] Assignee: Phillips Petroleum Company, Bartlesville, Okla.

[22] Filed: Jan. 3, 1972

[21] Appl. No.: 215,142

[52] U.S. Cl. ... 260/666 PY, 252/431 P, 260/439 R, 260/666 B, 260/673, 260/683.15 D
[51] Int. Cl. .............................................. C07c 3/10
[58] Field of Search ... 260/683.15 D, 680 B, 677 R, 260/439 R, 666 B, 666 PY, 673; 252/431 P

[56] References Cited
UNITED STATES PATENTS

| | | | |
|---|---|---|---|
| 3,485,881 | 12/1969 | Zuech | 260/683.15 D |
| 3,689,588 | 9/1972 | Dunn | 260/683.15 D |
| 3,390,195 | 6/1968 | Chappell et al. | 260/677 R |
| 3,420,904 | 1/1969 | Hellwig | 260/439 R |
| 3,674,825 | 7/1972 | Fitton et al. | 260/439 R |
| 3,686,245 | 8/1972 | Fahey | 260/439 R |
| 3,395,165 | 7/1968 | Feltham | 260/439 R |

OTHER PUBLICATIONS

Fahey, "J. Amer. Chem. Soc.," 92 (1970) pp. 402–404.

Primary Examiner—Paul M. Coughlan, Jr.

[57] ABSTRACT

An integrated process is provided wherein a nickel(0) complex-catalyzed oligomerization and a nickel(II) complex-catalyzed dimerization are coordinated such that the nickel(0) oligomerization catalyst is recovered after use in the nickel(II) complex form which is then utilized as a dimerization catalyst.

5 Claims, No Drawings

PROCESS FOR RECOVERING A NICKEL (0) OLIGOMERIZATION CATALYST IN THE FORM OF A NICKEL(II) DIMERIZATION CATALYST

This invention relates to nickel(0) and nickel(II) complex-catalyzed alkyne-diene-olefin chemistry processes. In another aspect, this invention relates to a coordinated oligomerization and dimerization process with the nickel values of the oligomerization catalyst being recovered in a dimerization catalyst form.

Various processes have been developed for the catalytic oligomerization as well as the catalytic dimerization in the general alkyne-diene-olefin chemistry field. These processes have individually utilized catalyst systems containing nickel complexes. Continuing interest in the efficiency of these processes is provided from the increasing demand for the resulting products. The aforementioned continuing interest has established a need in the art for improved nickel complex-catalyzed reactions and catalyst recovery processes.

It is an object of the invention to improve processing flexibility in the general field of alkyne-diene-olefin chemistry. Another object of the invention is the recovery of the nickel from an oligomerization catalyst in a form suitable for catalyzing a dimerization process.

The process of the present invention affords a technique for increasing operating flexibility in the general field of alkyne-diene-olefin chemistry. It has been discovered that a homogeneous nickel catalyst of the type employed in diene and/or alkyne oligomerization reactions can be converted, after use, to a different homogeneous nickel catalyst which has activity for olefin dimerization. These discoveries permit the heretofore unknown possibility of coordinating oligomerization and dimerization processes without introducing additional catalyst.

The nickel(0) diene oligomerization and the nickel(II) olefin dimerization processes are performed in a sequential fashion wherein the preparation and use of the diene and/or alkyne oligomerization nickel(0) complex catalyst represent the first stage. Suitable oligomerization catalysts can be prepared by contacting a nickel(II) compound with an organophosphorus compound and with an organometal or metal hydride type reducing agent. The organophosphorus compound is a triorganophosphine, i.e., represented by the formula $R'_3P$, and functions as a ligand. The oligomerization catalyst can be prepared in situ, in the presence of a diene and/or alkyne feedstock material which will be oligomerized. In accordance with the mode of operation, the reducing agent is added last, i.e., after the nickel(II) compound, the $R'_3P$ compound, the reaction solvent medium, and the diene and/or alkyne feed materials are already present.

Suitable nickel(II) compounds utilized in the preparation of the nickel(0) oligomerization catalyst include, for example, nickel chloride, nickel bromide, nickel acetate, nickel propionate, nickel iodide, nickel cyanide, nickel caproate, nickel benzoate, nickel naphthenate, nickel oxalate, nickel acetylacetonate, nickel benzoylacetonate, and the like. The nickel(II) compounds suitable for the aforementioned use may be generally classified as the nickel salts of inorganic and organic acids excepting those wherein the anion has definite oxidizing characteristics.

Ligands suitable for the preparation of the oligomerization nickel(0) complex catalyst can be characterized by the formula $R'_3P$ wherein $R'$ is alkyl, cycloalkyl, aryl, or combinations thereof including aralkyl, alkaryl and the like, wherein the maximum number of carbon atoms in an R group is 12. The $R'$ groups can be the same or different with P denoting phosphorus. A mixture of ligands also can be employed, if desired, and examples of the ligands include triethylphosphine, tricyclohexylphosphine, tributylphosphine, triphenylphosphine, dimethyl(phenyl)phosphine, tri(4-butylphenyl)phosphine, tri(4-phenylbutyl)-phosphine, tri-n-dodecylphosphine, and the like. Compounds involving chelating ligands also can be employed, for example, 1,2-diphenylphosphinoethane or 2,2'-bipyridyl.

Additional nickel(II) compounds suitable for reduction to form diene and/or alkyne oligomerization catalysts by reduction to nickel(0) species include the type having the formula $(R'_3P)_2NiX_2$ wherein $R'$ is as defined above and X is a halogen selected from the group consisting of chlorine, bromine and iodine. When the compounds having the formula $(R'_3P)_2NiX_2$ are reduced to a nickel(0) species as a diene oligomerization catalyst, both the nickel and the ligand requirements are supplied at the same time and it is not necessary to add additional ligand. However, additional ligand can be supplied if desired. The additional ligands can be the same as or different from those utilized or flowing from the compounds having the formula $(R'_3P)_2NiX_2$. Examples of the compounds having the formula $(R'_3P)_2NiX_2$ suitable for use according to the process of the invention include bis(triphenylphosphine)dichloronickel, bis(trimethylphosphine)dibromonickel, bis(tri-n-dodecylphosphine)dichloronickel, bis(tribenzylphosphine)dibromonickel, bis(triethylphosphine)dichloronickel, bis(tri-n-heptylphosphine)diiodonickel, and the like.

Diene feedstock suitable for use in the instant invention are conjugated and contain 4 to 7 carbon atoms per molecule. Such dienes include 1,3-butadiene, 2,3-dimethylbutadiene, isoprene, piperylene, 1,3-heptadiene, 1,3-hexadiene, 2,3-dimethylpiperylene, and the like. Substituted alkynes of the type $R-C \equiv C-R$ are employed according to the invention, and the R groups, which can be the same or different, are selected from the group consisting of hydrogen, alkyl, alkenyl, cycloalkyl, and aryl radicals including combinations thereof such as aralkyl and alkaryl. These alkynes include acetylene, vinylacetylene, cyclohexylacetylene, phenylacetylene, 2-pentyne, benzyl-p-tolylacetylene, and the like.

Organometallic or metal hydride reducing agents suitable for use in accordance with the invention include compounds of elements from groups IA, IIA, IIB and IIIA of the periodic system of the elements taken from "Periodic Table of the Elements," Handbook of Chemistry and Physics, Chemical Rubber Company, 45th Edition, 1964, p. B-2. The preferred metallic elements taken from the above tables include lithium, sodium, potassium, magnesium, calcium, boron and aluminum, and are preferred for reasons of availability. Examples of suitable reducing agents include lithium hydride, sodium hydride, lithium-aluminum hydride, sodium borohydride, calcium hydride, aluminum hydride, phenyl-sodium, phenyllithium, benzylpotassium, phenylmagnesium chloride, ethylmagnesium bromide, triethylaluminum, diisobutylaluminum hydride, diethylethoxyaluminum, phenylaluminum sesquichloride, diethylaluminum chloride, magnesiumdiethyl, berylliumdiethyl, diborane, triethylboron, diethylzinc and diethylcadmium.

The preparation of the oligomerization catalyst and its use in an oligomerization reaction can be effectively achieved under the following conditions. In preparing the nickel(0) catalyst complex, a mole ratio of the $R_3P$ compound to the nickel(II) compound ranges from 0.01–20 with a preferred range being from 1–8. The mole ratio of the reducing agent to the nickel(II) compound ranges from 1–10 with a preferred range of from 1–5. Suitable solvents which provide the reaction medium include hydrocarbons such as benzene, toluene, xylene, decalin, cyclohexane, methylcyclohexane, isooctane; ethers such as diethyl ether, dioxane, tetrahydrofuran, ethyl n-propyl ether; and any other diluent or solvent that is inert under the reaction conditions described herein.

The concentration of the reactants is not necessarily critical and, if desired, the reaction can take place in the absence of an added solvent if the diene and/or the alkyne feed material is in liquid phase at operating conditions and thus acting as the solvent medium. Temperatures can range from −20 to 150° C., while the reaction pressure requirement is normally in the range of from 1 to 100 psig. The reaction takes from a few minutes up to 48 hours, depending upon the other variables such as temperature and catalyst concentration level.

The conversion of the nickel(0) complex oligomerization catalyst described above to a nickel(II) dimerization catalyst for olefin dimerization according to the process of the invention results in a catalyst having the formula $X(R'')Ni(R'_3P)_2$ wherein the nickel and the $R'_3P$ compound are derived from the above-prepared and employed oligomerization catalyst. Such a dimerization catalyst of an organonickel(II) complex may be termed a halo(organo)bis(triorganophosphine)nickel-(II). $R''$ represents an aryl or a halogenated aryl, or a halogenated vinyl group, and X is a halogen atom which was in effect introduced along with $R''$ in the form of the compound $R''X$. The dimerization catalyst, $X(R'')Ni(R_3P)_2$, arises from the oxidative addition of the compound $R'X$ to the used oligomerization catalyst. Suitable $R''X$ compounds include, for example, 1,2,4-trichlorobenzene, chlorotrifluoroethylene, chlorobenzene, bromopentafluorobenzene, hexachlorobenzene, 1-chloro-2,6-difluorobenzene, tetrachloroethylene, tetrabromoethylene and the like.

Suitable reaction conditions for preparing the nickel-(II) complex dimerization catalyst involve a temperature range of from 0° to 100° C. and a $R''X$ to nickel-(II) mole ratio of from 150-1 with a preferred mole ratio range of 75-1. The reaction time for the oligomerization catalyst conversion requires within the range of from a few minutes to 24 hours, with a preferred range of from 15 minutes to 4 hours.

The nickel(II) complex dimerization catalyst can, for example, be isolated by removal of volatiles followed by recrystallization, for example, from ethanol, and/or passage in hydrocarbon solution, for example benzene, over a column of acid-washed alumina followed by elution with ether-pentane and solvent removal. Procedural modifications can be made as dictated by the properties of the various, specific halo(organo)bis(triorganophosphine)nickel(II) complexes.

The flexibility of the present invention allows choice as to several optional oligomer isolation techniques of which the following are examples:

1. After synthesizing the olefin dimerization catalyst, in accordance with the operational sequence of the invention, column chromatography could be employed both to isolate the oligomers and to purify the olefin dimerization catalyst. Alternatively, if the dimerization catalyst were isolated by recrystallization, the oligomers could be recovered subsequently from the residue through distillation means.

2. After synthesizing the olefin dimerization catalyst, in accordance with the operational sequence of the invention, the oligomers could be distilled from the crude product mixture prior to isolation and purification of the dimerization catalyst.

3. Isolation of the oligomers could be deferred until after the olefin dimerization reaction itself with, then, separation through distillative or chromatographic means of the oligomer-dimer mixture. Deferring the isolation of oligomers in this manner would expose the oligomers to dimerization conditions.

It is generally preferable to synthesize the dimerization catalyst prior to isolating the oligomers because the dimerization catalyst is more stable (to heat as in distillation) than is the oligomerization catalyst.

Olefins to which the present dimerization process is applicable include cyclic and acyclic monoolefins having from about 2 to 12 carbon atoms, inclusive, wherein the acyclic monoolefin can be a terminal or an internal olefin, branched or unbranched. Examples of suitable monoolefins which can be dimerized according to the invention are ethylene, propylene, 1-butene, 2-butene, 1-pentene, 2-pentene, cyclopentene, cyclohexene, 4-methylcyclohexene, 3-methylbutene-1, cycloheptane, 2-hexene, 1-heptene, cyclooctene, 4,4-dimethyl-heptene-2, 1-decene, 1-dodecene, and the like and mixtures thereof.

An alkylaluminum halide is employed as a cocatalyst with the nickel(II) complex dimerization catalyst. The olefin feed may be added to the nickel(II) complex catalyst either before or after introduction of the alkylaluminum halide. However, it is preferable to add the olefin prior to the introduction of the alkylaluminum halide since higher olefin conversions are achieved through this addition sequence. Examples of suitable alkylaluminum halides are ethylaluminum dichloride, diethylaluminum chloride, dihexylaluminum bromide, dimethylaluminum chloride, methylaluminum dichloride, and mixtures thereof such as methylaluminum sesquichloride, ethylaluminum sesquichloride, and the like.

Suitable and preferred reaction conditions for the dimerization stage of the present process include a mole ratio of alkylaluminum halide to the nickel(II) complex dimerization catalyst of from 100/1 to 0.01/1, with the preferred range of from 25/1 to 0.1/1.

Suitable solvent reaction media are comprised of aromatic, aliphatic, cycloaliphatic, chlorinated hydrocarbons or mixtures thereof. Preferred solvents are, for example, isooctane, toluene, cyclohexane, tetrachloroethane, chlorobenzene, and o-dichlorobenzene. The concentration of the olefin dimerization catalyst in the solvent is not critical and can range from 1-millionth molar to the saturation point, preferably being 0.1 to 0.00001 molar.

The dimerization process can occur at a temperature of from −25 to 125°C. with a preferred temperature being in the range of −10 to 50°C. The dimerization process is maintained under a pressure of from 1 to 150 psig for a period of from a few minutes to 24 hours, preferably from 15 minutes to 6 hours, depending upon the other reaction conditions.

The following examples illustrate the use of a nickel(0) diene and/or alkyne oligomerization catalyst followed by its conversion to a nickel(II) olefin dimerization catalyst. Oligomers are not isolated in either Example I or Example II, but they are identified in Example II. Olefin dimers are not isolated in either example, but their carbon skeleton types and relative amounts thereof are determined in Example I. Example I employs a substituted acetylene, whereas Example II employs acetylene. The nickel(II) dimerization catalyst complex prepared in Examples I and II is identified precisely in Example II. While Example II does not show the dimerization reaction, there is no reason to doubt that the particular pure sample prepared therein possesses catalytic ability for dimerization.

EXAMPLE I

Part A. Formation of Oligomerization Catalyst Followed by Oligomerization

Nitrogen was passed for 1.5 hours through a solution of nickel acetylacetonate (0.40 gram, 1.6 mmoles) and trielhylphosphine (0.80 gram, (6.78 mmoles) in tetrahydrofuran (120 ml). Triethylaluminum (3.1 mmoles, 2.0 ml. of a 25 weight percent solution in cyclohexane) was then added and the resulting solution was warmed to 55°–60° C. for 2 hours under continuing nitrogen ebullition. A butadiene-vinylacetylene-2 butene mixture was passed through the above solution at the rate of 4 ml/minute. Analyses of both feed and effluent were by gas-liquid partition chromatography.

|  | Feed Wt. % | Effluent Wt. % |
| --- | --- | --- |
| trans 2-butene | 33.4 | 36.7 |
| cis 2-butene | 28.8 | 30.2 |
| 1,3-butadiene | 32.2 | 31.3 |
| vinylacetylene | 5.39 | 1.62 |

Since the 2-butene isomers do not react, their fraction of the gas mixture is increased by the removal through oligomerization of substantial amounts of butadiene and vinylacetylene. Considering the absolute amount of 2-butene to be constant, the amounts of butadiene and vinylacetylene in the effluent are made comparable to the corresponding values in the feed by employing the factor $$33.4 + 28.8/36.7 + 30.2 = 62.2/66.9 = 0.93$$

i.e., the respective weight percentage recovery values are:

butadiene $$(31.3)(0.93) \times 100/32.2 = 90.3\%$$

vinylacetylene $$(1.62)(0.93) \times 100/5.39 = 28.0\%$$

Conversely, the respective weight percentages of oligomerization values are

Butadiene 9.7
Vinylacetylene 72.0

Part B. Formation of Dimerization Catalyst

Tetrachloroethylene (16.2 grams, 97.5 mmoles, 10 ml.) was added to the product mixture from Part A, and this combination was refluxed under nitrogen for 1 hours and allowed to stand overnight. After an additional 3 hours at reflux, the mixture was cooled, filtered, taken to dryness at reduced pressure, dissolved in ethanol, filtered, and again taken to dryness. The oily residue was fluidized by diluting with a pentane-benzene mixture and chromatographed on a column of acid-washed alumina with elution by 50 percent ether in pentane. The elution solvents were stripped and the resulting residue was recrystallized from methanol and water at approximately −30° C. to yield 0.0524 gram of chloro(trichlorovinyl)bis(triethylphosphine)nickel(II).

Part C. Dimerization

Chloro(trichlorovinyl)bis(triethylphosphine)nickel(II) (0.0457 gram, 0.10 mmole, from Part B) and chlorobenzene (20 ml.) were charged to a dry, capped 7-ounce beverage bottle. After purging first with nitrogen and second with propylene, the bottle and contents were cooled to 0° C. After 5 minutes, and with stirring and continued cooling to 0° C., the bottle was pressurized with propylene to 30 psig, vented to 5 psig, additionally charged with ethyl-aluminum dichloride (0.700 mmole as 0.70 ml. of a 1 molar solution in chlorobenzene), repressured to and maintained at 30 psig with propylene. After 1 hour under these conditions, the bottle was vented and 10 ml. of saturated, aqueous sodium chloride was added. The aqueous phase was extracted with chlorobenzene, the chlorobenzene solutions were combined, dried over magnesium sulfate and distilled. A 9.2 gram yield of mixed hexene isomers was collected. A 2.0 gram sample of that mixture was hydrogenated (to facilitate analysis for distribution among carbon skeleton types) over 0.1 gram platinum oxide under 20 psig hydrogen for 5 hours. Analysis (gas-liquid partition chromatography): n-hexane, 12.6-%; 2-methylpentane, 66.8%; and 2,3-dimethylbutane, 19.6%.

EXAMPLE II

Part A. Formation of Oligomerization Catalyst Followed by Oligomerization

A dry, 3-ounce glass reactor was charged with nickel acetylacetonate (0.30 gram, 1.2 mmoles), cyclohexane (10 ml.) and triethylphosphine (0.27 gram, 2.3 mmoles). The reactor was closed, flushed with nitrogen, partially evacuated, cooled to −78° C., and charged with butadiene (10.8 grams, 200 mmoles), acetylene (1.3 grams, 50 mmoles) and triethylaluminum (2.4 ml. of a 25 percent solution in pentane). This mixture was stirred for 2 hours at 0° C. and 45 psig followed by 1 hour at 25° C. and 55 psig declining to approximately 5 psig within that hour. Analysis by gas-liquid partition chromatography: 4-vinylcyclohexene, 0.858%; benzene, 11.126%; 5-vinylcyclohexa-2,3-diene, 82.378%; tricyclooctene, 0.600%; 1,3,6-cyclooctatriene, 0.229%; and many minor products. (No internal standard could be accurately employed, and therefore the above analysis affords only product distribution and not, also, actual yields.)

Part B. Formation of Dimerization Catalyst

Tetrachloroethylene (3.2 grams, 19.5 mmoles, 2 ml.) was added to the product mixture from Part A and this mixture was stirred overnight at 25° C. The solution was concentrated under reduced pressure and the concentrate was chromatographed on acid-washed alumina with elution by 2 volume percent methanol in pentane. After solvent removal, the sample was fluidized by the addition of a small amount of pentane-benzene and rechromatographed with elution by benzene. A 0.12 gram yield resulted. Recrystallization from methanol afforded yellow crystals, melting point 93°–93.5° C. Infrared absorption spectra agreed with that of trans-chloro(trichlorovinyl)bis(triethylphosphine)nickel(II). Calculated for $C_6H_{10}Cl_4P_2Ni$:
Calculated: C, 36.48; H, 6.56. Found: C, 36.42; H, 6.67.

Various modifications of this invention can be made or followed, in view of the foregoing, without departing from the spirit or the scope thereof.

What is claimed is:

1. An integrated nickel(0) complex-catalyzed oligomerization and a nickel(II) complex-catalyzed dimerization process, comprising:
   a. contacting at least one compound selected from the group consisting of conjugated diolefins having from 4 to 7 carbon atoms per molecule and substituted alkynes having the structure R-C ≡ C-R wherein each R is individually selected from the group consisting of hydrogen, alkyls, having 1 to 10 carbon atoms, cycloakyls having 3 to 8 carbon atoms, aryls, alkaryls, and aralkyls having 6 to 10 carbon atoms, in the presence of a nickel(0) complex containing the radical $R'_3P$ wherein each R' has from 1 to 12 carbon atoms and is individually selected from the group consisting of alkyl, cycloalkyl, aryl, and combinations thereof;
   b. contacting the resulting admixture of step (a) with at least one halogen containing compound having the formula R' 'X, wherein R'' is selected from the group consisting of aryl, halogenated aryl and halogenated vinyl; and X is a halogen atom;
   c. isolating the resulting nickel(II) complex having the formula $X(R'')Ni(R'_3P)_2$; and
   d. contacting the isolated nickel(II) complex with cyclic or acyclic monoolefins having from about 2 to about 12 carbon atoms per molecule in the presence of an alkylaluminum halide under dimerization conditions.

2. The process according to claim 1 wherein oligomers contained in the resulting admixture of step (a) are isolated after the sequential step (c).

3. The process according to claim 1 wherein the oligomers contained in the resulting admixture of step (a) are isolated after the sequential step (d).

4. The process according to claim 1 wherein reactants of step (a) are contacted at a temperature of from −20° C. to 150° C., under a pressure of from 1 to 100 psig for a period of up to 48 hours, and the dimerization process of step (d) is at a temperature of from −25 to 125° C. under a pressure of 1 to 150 psig for a period of up to 24 hours.

5. The process according to claim 1 wherein both steps (a) and (b) occur in the presence of a solvent reaction media selected from the group consisting of aromatic, aliphatic, cycloaliphatic and chlorinated hydrocarbons.

* * * * *